United States Patent
Johnston

(10) Patent No.: US 6,222,625 B1
(45) Date of Patent: Apr. 24, 2001

(54) ADJUSTABLE LASER STRING SQUARE

(76) Inventor: William R. Johnston, 1334 Chelsea La., Safford, AZ (US) 85546

( * ) Notice: Subject to any disclaimer, the term of this patent is extended or adjusted under 35 U.S.C. 154(b) by 0 days.

(21) Appl. No.: 09/373,727

(22) Filed: Aug. 13, 1999

(51) Int. Cl.[7] ............................ G01B 3/56; G01C 9/02
(52) U.S. Cl. ................................ 356/247; 33/534
(58) Field of Search .......................... 356/247, 249, 356/250, 399, 149, 138, 148, 248; 33/340, 341, 343, 369, 372, 373, 227, 290, 534

(56) References Cited

U.S. PATENT DOCUMENTS

| | | | |
|---|---|---|---|
| 4,221,483 | 9/1980 | Rando | 356/250 |
| 4,993,161 | 2/1991 | Borkovitz | 33/291 |
| 5,108,177 | 4/1992 | Middleton | 356/250 |
| 5,561,911 | 10/1996 | Martin | 33/365 |
| 5,572,796 | 11/1996 | Breda | 33/283 |
| 5,594,993 | 1/1997 | Tager et al. | 33/227 |
| 5,636,018 | 6/1997 | Hirano et al. | 356/248 |
| 5,754,582 | 5/1998 | Dong | 372/107 |
| 5,784,155 | 7/1998 | Ohtomo et al. | 356/141.1 |
| 5,859,693 | 1/1999 | Dune et al. | 356/4.01 |

*Primary Examiner*—Frank G. Font
*Assistant Examiner*—Michael P. Stafira
(74) *Attorney, Agent, or Firm*—Edward L. White

(57) ABSTRACT

The present invention relates to an apparatus for designating and marking an area. The apparatus consists of a hanger for suspension to a string line. Attached to this hanger is a brace which supports a pivoting laser source. This laser source may be rotated to any desired angle, so that the laser source projects its beam to a desired location for use in marking this location. The desired angle is designated with a compass plate and pointer.

4 Claims, 3 Drawing Sheets

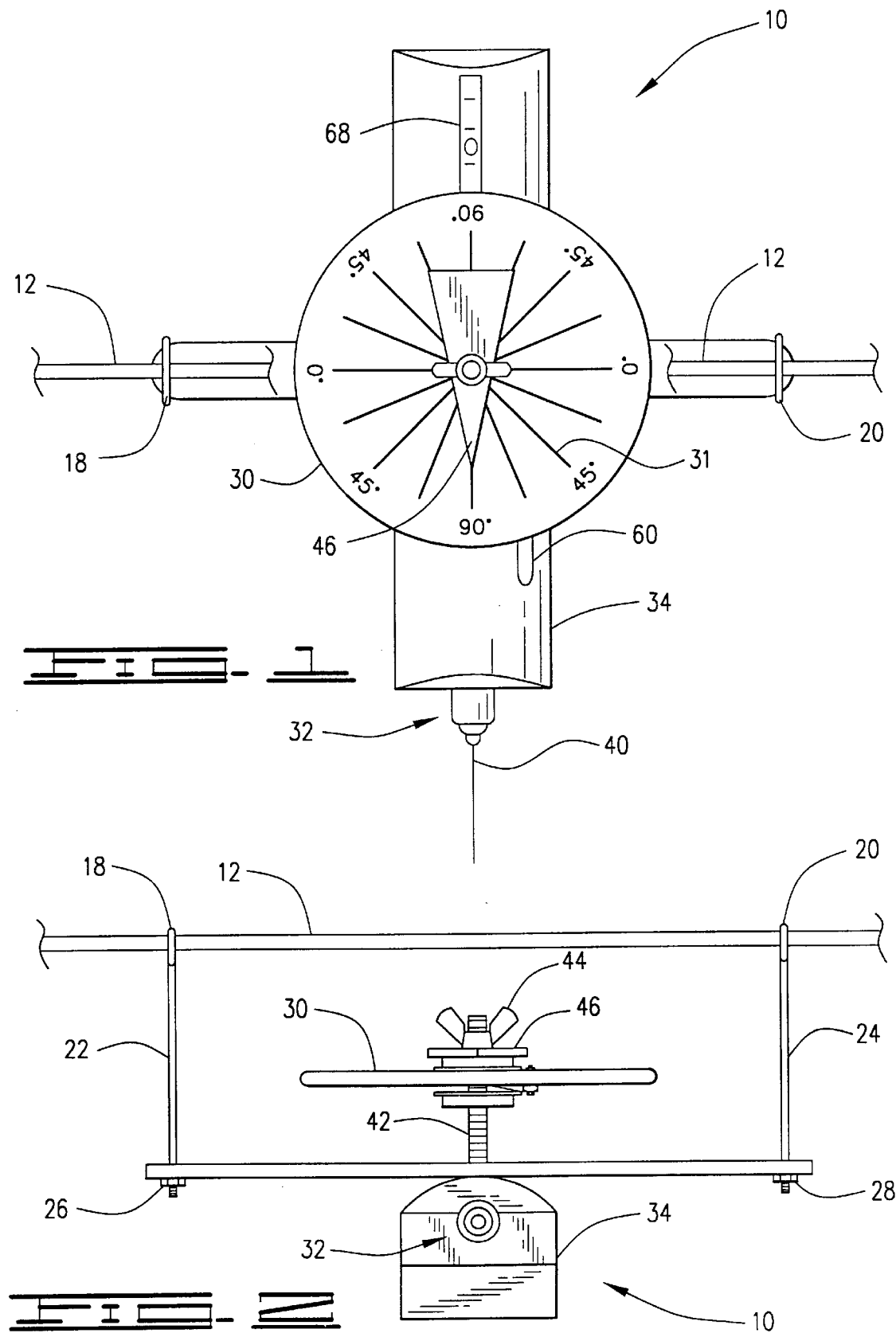

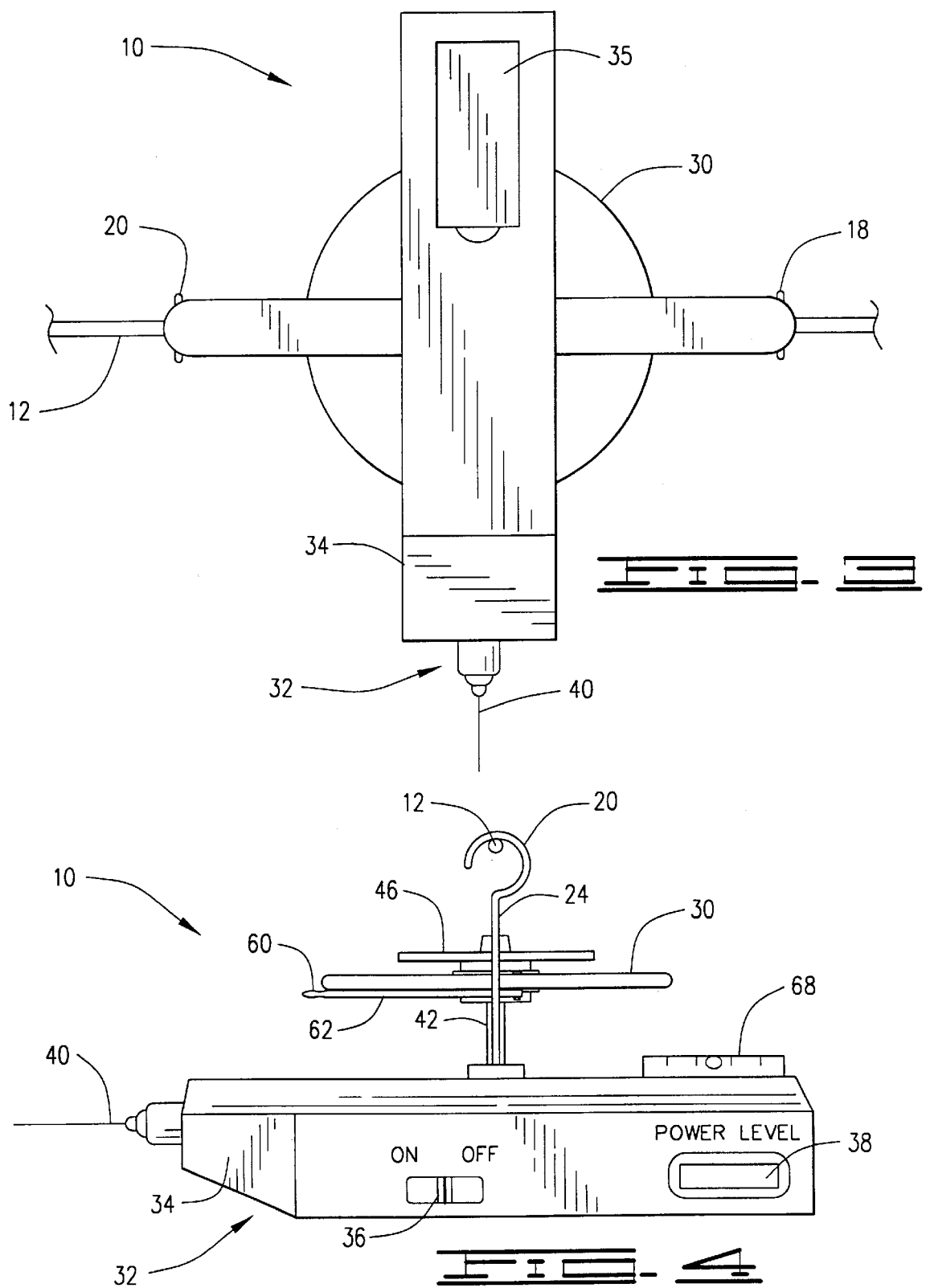

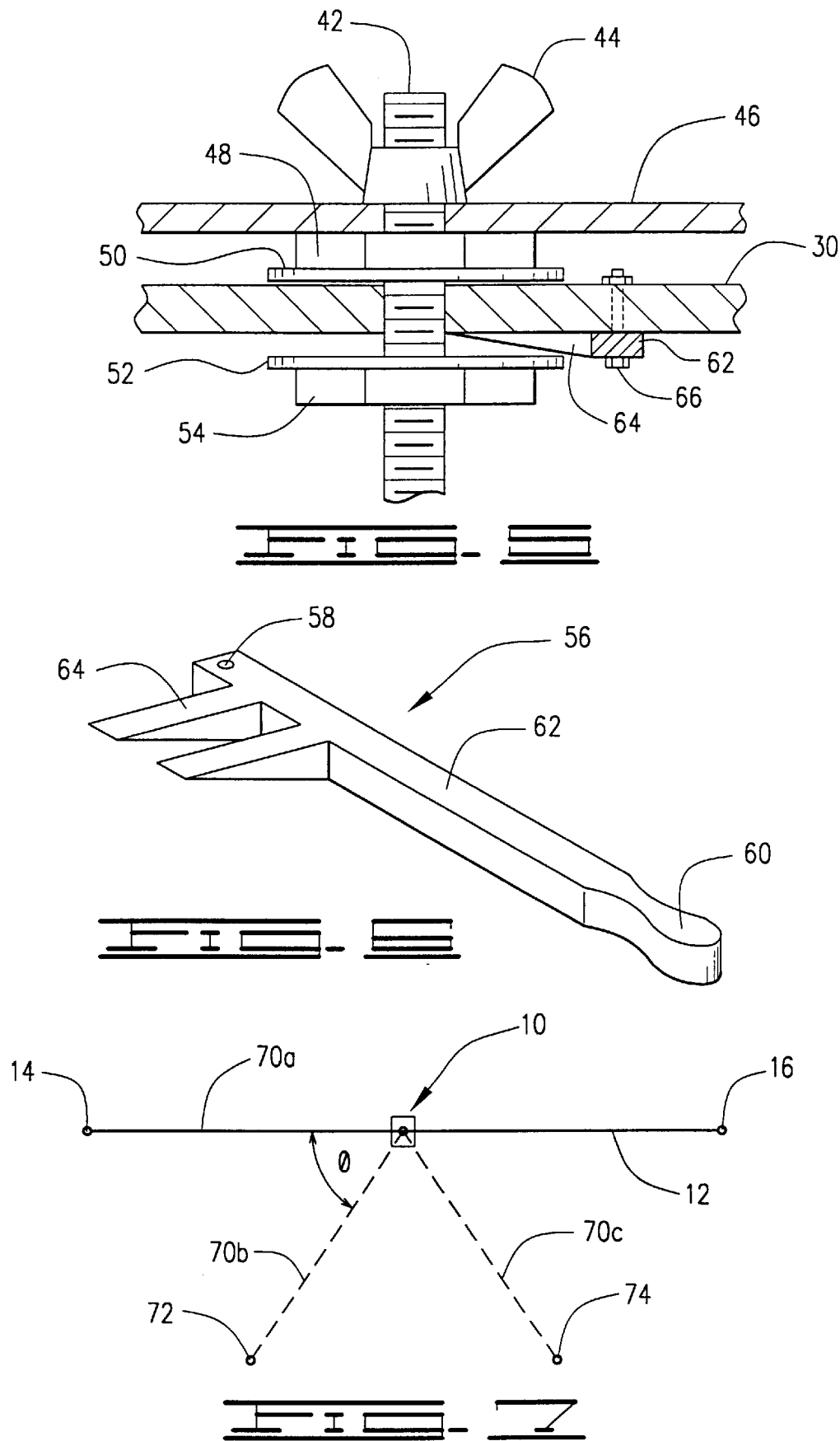

ADJUSTABLE LASER STRING SQUARE

CROSS REFERENCES TO RELATED APPLICATION

None.

BACKGROUND OF THE INVENTION a. Field of the Invention

The invention relates to devices which make measurements and measure angles for construction. In particular, the invention relates to devices which use a laser beam mounted onto a string line to aid in construction layouts.

b. Description of the Prior Art

The prior art contains multiple devices which use a laser beam to aid in construction layouts. Many of these devices are used as levels which project a laser beam in a horizontal plane. U.S. Pat. No. 4,221,483 to Rando uses a complex level system to emit a horizontal laser which is detected by an electronic detector. Many of these devices are confined to mounting on a tripod or other platforms. Other devices emit laser beams perpendicular to a given plane. U.S. Pat. No. 5,594,993 to Tager emits such a beam from a hand held device and can substitute for a string line.

The limitations of a required detector, a fixed height platform, and a perpendicular emitted laser beam make it desirable to have an invention which overcomes these limitations.

SUMMARY OF THE INVENTION

It is therefore an object of the invention to provide an apparatus which does not require a detector, can be used at any desired height, and can designate angles for laying out and marking a construction site. The present invention accomplishes this objective by providing hangers and a brace to support a laser unit from a string line fixed between two reference points, using a cooperating compass plate and compass pointer so that an angle relative to the line formed by the string can be selected for the emitted laser.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. Additional benefits and advantages of the present invention will become apparent in those skilled in the art to which the present invention relates from the subsequent description of the preferred embodiment and the appended claims, taken in conjunction with the accompanying drawings. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application which is measured by the claims, nor is it intended to be limiting as to the scope of the invention in any way.

BRIEF DESCRIPTION OF THE DRAWINGS

The invention will be better understood and the objects other than those set forth above will become apparent when consideration is given to the following detailed description thereof. Such description makes reference to the annexed drawings wherein:

FIG. 1 is a top view of the present invention.

FIG. 2 is a front view of the present invention.

FIG. 3 is a bottom view of the present invention.

FIG. 4 is a side view of the present invention.

FIG. 5 is a detail view in cross section of the rotation support means.

FIG. 6 is a perspective view of the locking lever.

FIG. 7 is a schematic representation of the present invention in operation.

DETAILED DESCRIPTION OF PREFERRED EMBODIMENTS

The present invention comprises an adjustable laser string square 10 as generally shown in FIGS. 1 through 4. The adjustable laser string square 10 is supported from a string line 12 strung tautly between a first point 14 and a second point 16. As shown in FIG. 1, a first hanger 18 and a second hanger 20 support the adjustable laser string square 10 from the string line 12. Depending from the first hanger 18 is a first support shaft 22; similarly, a second support shaft 24 depends from the second hanger 20. As shown in FIG. 7, the first and second attachment means, 26 and 28, attach the first and second support shafts, 22 and 24, to a compass plate 30. The compass plate 30 has angular markings 31 thereon ranging from 0° to 90°. A laser unit 32 is supported from the compass plate 30. The laser unit 32 is housed in a laser unit housing 34. A battery compartment 35 is disposed on a lower surface of the laser unit housing 34. As shown in FIG. 4, the side view, the laser unit housing 34 also incorporates an on/off switch 36 and a power level switch 38. A laser source 40 is disposed at an end of the laser unit housing 34.

FIGS. 2, 4, 5 and 6 illustrate a rotational support means for supporting the laser string square 10 from the compass plate 30 in a rotatable manner. The laser unit 32 depends from a support shaft 42. The support shaft 42 depends from the compass plate 30 as shown in FIG. 4. At an upper end of the support shaft 42 is a wing nut 44. The wing nut 44 is used to secure the compass pointer 46. An upper nut 48 provides the actual support for the support shaft 42. Disposed underneath the upper nut 48 is an upper washer 50. Preferably, the upper washer 50 is composed of a plastic or rubbery material, preferably Teflon®. The purpose of the upper nut 48 is to allow rotation of the support shaft 42 relative to the compass plate 30, while providing a gripping means should a user desire to fix the compass pointer 46 in place. Below the compass plate 30 is a lower washer 52 and a lower nut 54. A locking lever 56 is disposed adjacent to the lower nut 54 and lower washer 52. The locking lever 56 is attached via a pivot point 58. A straight portion 62 extends outwardly so that a thumb grip portion 60 extends beyond the edge of the compass plate 30. Fastened onto the straight portion 62 are a pair of angular friction plates 64. A center end of the angular friction plates 64 is disposed between the lower washer 52 and the compass plate 30. When biased toward the support shaft 42, the angular friction plates 64 tend to fix the support shaft 42 into place so that it does not rotate. The locking lever 56 is fastened to the compass plate 30 via a pivot bolt 66.

As shown in FIG. 1 the laser string square 10 may also incorporate a bubble level 68 or the like. This allows a user to determine whether a point indicated by the laser beam is on a horizontal plane with the laser unit 32. It is well known in the prior art to provide an electronic level means with a digital readout.

As shown, the compass pointer 46 and the compass plate 30 comprise an angle selector means. Alternatively, so that angles can be precisely measured, the support shaft 42 may employ a mechanism so that the compass pointer 46 clicks into an angle, or in the alternative, allows smooth rotation into any angle measurement. Additionally, a digital readout may be employed so that an angle may be precisely found. Also, configurations for the angle selector means are also possible, given the foregoing description.

OPERATION OF APPARATUS

Before operating the apparatus, it is important to calibrate it to ensure that it is calibrated properly. The calibration device is very simple. The laser unit 32 is turned so that the emitted laser points at either the first point 14 or the second point 16. The wing nut 44 is then loosened. The compass pointer 46 is aligned with the angular markings 31 on the compass plate 30 so that it is at the appropriate zero marking. The compass pointer 46 and the compass plate 30 cooperate to form the angle selector means. The laser unit 32 is then rotated 180° to ensure that when the emitted laser is pointing at the opposite point (again, either the first point 14 or the second point 16) that the compass pointer 46 is then pointing at the corresponding zero degree reading.

Once the device has been calibrated, it is ready to be used. In operation, the apparatus is first suspended from a string line defining a straight line between a first point 14 and a second point 16. The adjustable laser string square 10 is then moved to the appropriate starting point for the desired measurement. Once located at the desired starting point, the laser unit 32 is turned so that the emitted laser beam is at the desired angle as indicated on the compass plate 30 by the compass pointer 46. A user then moves outwardly the desired radial distance from the adjustable laser string square 10, and, using an opaque or translucent surface, identifies the line made by the laser beam. The point at the desired distance and the desired angle, is then marked by a stake or other traditional means of marking a point. If it is desired to mark still another point from the point just marked, a new string line is set up along the line just marked, then the adjustable laser string square 10 is moved over the point just marked, to be used to find the new point. Once the adjustable laser string square 10 has been moved, it is ready to be used again.

As shown in FIG. 7, which is a schematic representation of the present invention in operation, the adjustable laser string square 10 is supported at a point between the first point 14 and the second point 16. The distance from the adjustable laser string square 10 to the first point 14 is length 70a. Length 70b is the distance between the adjustable laser string square 10 and a third point 72. The distance 70c between the adjustable laser string square 10 and a fourth point 74 is also the same. FIG. 7 illustrates how the present invention may be used to mark points to make a hexagonal semi-circle. To make a complete hexagon, the mirror image of the point shown in FIG. 7 would be marked using the adjustable laser string square 10.

Having thus described the field of the invention, the prior art, the attached drawings, the summary of the invention, and the detailed description of the preferred embodiments, I claim:

1. An apparatus for finding angles incident to a string line, the apparatus comprising:

a. a hanger means for removable attachment to the string line;

b. a laser beam projection means, supported by the hanger means for emitting a laser beam; and c. an angle selector means for designating an angle incident to the string line by which the laser beam may be directed.

2. The apparatus of claim 1 where the angle selector means is a plate with angular markings thereon cooperating with a compass pointer.

3. The apparatus of claim 1 where the angle selector means is a digital read out of the angle between the string line and the laser beam.

4. The apparatus of claim 2 where a level is incorporated in the laser string square.

\* \* \* \* \*